(12) United States Patent
Kauschke et al.

(10) Patent No.: US 6,872,274 B2
(45) Date of Patent: Mar. 29, 2005

(54) METHOD OF MAKING NONWOVEN WITH NON-SYMMETRICAL BONDING CONFIGURATION

(75) Inventors: Michael Kauschke, Rimsting (DE); Mordechai Turi, Princeton Junction, NJ (US)

(73) Assignee: First Quality Nonwovens, Inc., State College, PA (US)

( * ) Notice: Subject to any disclaimer, the term of this patent is extended or adjusted under 35 U.S.C. 154(b) by 0 days.

(21) Appl. No.: 09/971,797

(22) Filed: Oct. 5, 2001

(65) Prior Publication Data

US 2002/0036062 A1 Mar. 28, 2002

Related U.S. Application Data

(60) Division of application No. 09/460,660, filed on Dec. 13, 1999, now Pat. No. 6,537,644, which is a continuation-in-part of application No. 09/374,825, filed on Aug. 13, 1999, now abandoned.

(51) Int. Cl.$^7$ .............................. D04H 3/12; D04H 3/14

(52) U.S. Cl. .................. 156/181; 156/209; 156/290

(58) Field of Search ............................... 167/167, 181, 167/209, 290

(56) References Cited

U.S. PATENT DOCUMENTS

| | | | |
|---|---|---|---|
| 2,986,780 A | | 6/1961 | Bletzinger |
| 3,607,567 A | | 9/1971 | Fairbanks |
| 3,855,046 A | | 12/1974 | Hansen et al. |
| 3,900,632 A | * | 8/1975 | Robinson .................... 428/196 |
| 4,041,203 A | * | 8/1977 | Brock et al. ................. 428/157 |
| 4,223,059 A | | 9/1980 | Schwarz |
| 4,223,063 A | | 9/1980 | Sabee |
| 4,252,590 A | | 2/1981 | Rasen et al. |
| 4,333,979 A | | 6/1982 | Sciaraffa et al. |
| 4,342,807 A | | 8/1982 | Rasen et al. |
| 4,486,485 A | * | 12/1984 | Sookne ....................... 428/198 |
| 4,493,868 A | * | 1/1985 | Meitner ....................... 428/171 |
| 4,588,630 A | | 5/1986 | Shimalla |
| 4,778,460 A | | 10/1988 | Braun et al. |
| 4,781,966 A | | 11/1988 | Taylor |
| 4,834,741 A | | 5/1989 | Sabee |
| 4,968,313 A | | 11/1990 | Sabee |
| 4,999,235 A | * | 3/1991 | Lunn et al. ................. 428/156 |
| 5,156,793 A | | 10/1992 | Buell et al. |
| 5,167,897 A | | 12/1992 | Weber et al. |
| 5,236,430 A | | 8/1993 | Bridges |
| 5,246,433 A | | 9/1993 | Hasse et al. |
| 5,431,986 A | | 7/1995 | Ortega et al. |
| 5,464,401 A | | 11/1995 | Hasse et al. |
| 5,494,736 A | * | 2/1996 | Willey et al. ............... 428/288 |
| 5,507,736 A | | 4/1996 | Clear et al. |
| 5,527,304 A | | 6/1996 | Buell et al. |
| 5,560,974 A | * | 10/1996 | Langley ...................... 428/198 |
| H1674 H | | 8/1997 | Ames et al. |
| 5,756,614 A | * | 5/1998 | Chien et al. ................. 526/160 |
| 5,837,352 A | | 11/1998 | English et al. |

(List continued on next page.)

FOREIGN PATENT DOCUMENTS

| | | |
|---|---|---|
| FR | 78 15461 | 7/1979 |
| WO | WO 00/78883 A1 * | 12/2000 |
| WO | WO 01/00915 A1 | 1/2001 |

Primary Examiner—Sam Chuan Yao
(74) Attorney, Agent, or Firm—Amster, Rothstein & Ebenstein (57) ABSTRACT

A nonwoven has low tensile and high elongation in the first direction (typically the CD) and high tensile and low elongation in the second direction (typically the MD). The nonwoven has a plurality of bonding points defining a total bonding area along the second direction greater than along the first direction. Accordingly, the nonwoven has unbonded fiber portions and bonded fiber portions, with a bonded portion/unbonded portion ratio greater along the second direction than along the first direction. The bonding points are preferably either circular or oval in plan.

28 Claims, 4 Drawing Sheets

U.S. PATENT DOCUMENTS

| | | |
|---|---|---|
| 5,843,057 A | 12/1998 | McCormack |
| 5,858,515 A | 1/1999 | Stokes et al. |
| 5,964,742 A | 10/1999 | McCormack et al. |
| 6,053,999 A * | 4/2000 | Marcus ..................... 156/73.2 |
| 6,093,665 A | 7/2000 | Sayovitz et al. |
| 6,096,668 A * | 8/2000 | Abuto et al. ................. 442/328 |
| 6,465,073 B1 * | 10/2002 | Morman et al. ............ 428/103 |

* cited by examiner

METHOD OF MAKING NONWOVEN WITH NON-SYMMETRICAL BONDING CONFIGURATION

CROSS-REFERENCE TO RELATED APPLICATION

This is a divisional of U.S. patent application Ser. No. 09/460,660, filed Dec. 13, 1999, now U.S. Pat. No. 6,537,644 itself a continuation-in-part of U.S. patent application Ser. No. 09/374,825, filed Aug. 13, 1999 now abandoned.

BACKGROUND OF THE INVENTION

The present invention relates to a nonwoven having a non-symmetrical bonding configuration yielding low tensile strength and high percent elongation in a first direction (e.g., CD) and high tensile strength and low percent elongation in a second direction (e.g., MD).

Spunbond nonwoven fabrics are made of continuous strands or filaments that are laid down on a moving conveyor belt in a randomized distribution. In a typical spunbond process, resin pellets are processed under heat to a melt and then fed through a spinnerette to create hundreds of thin filaments or threads. Jets of air cause the threads to be elongated, and the threads are then blown onto a moving web where they are laid down and sucked against the web in a random pattern to create a fabric. The fabric then passes through a bonding station. Bonding is necessary because the filaments or threads are not woven together.

The typical bonding station includes a bonding roll defining a series of identical raised points (bonding points). These bonding points are generally equidistant from each other and are in a uniform symmetrical pattern extending in both the machine direction (MD) and the cross direction (CD).

Other nonwoven fabrics include fabrics made from staple fibers, meltblown fibers, carded fibers and and short cut fibers. As used herein the terms "spun fibers" and "fibers" include the spun filaments described above as well as staple fibers, meltblown fibers, carded fibers and and short cut fibers.

A non-symmetrical bonding pattern could result in a fabric with an expected or standard elongation in one direction (e.g., MD), but increased elongation in the other direction (e.g., CD). This is a desired attribute in situations where minimal elongation is required in the machine direction and yet high elongation is required in the cross direction. For example, any elongation in the machine direction will disrupt the converting machines that are used to make diapers, while substantial elongation in the cross direction is desired to give each individual diaper some give around the wearer's waist.

Accordingly, it is an object of the present invention to provide a nonwoven having a non-symmetrical bonding configuration.

Another object of the present invention is to provide a nonwoven fabric which is highly extensible in a first direction (typically the CD) as compared to a second direction (typically the MD).

Another object is to provide such a nonwoven having low tensile strength and high percent elongation in the first direction (typically the CD), and high tensile strength and low percent elongation in the second direction (typically the MD).

It is also an object of the present invention to provide such a nonwoven which is simple and economical to manufacture, use and maintain.

SUMMARY OF THE INVENTION

It has now been found that the above and related objects of the present invention are obtained in a nonwoven having high elongation in a first direction (typically the CD) and low elongation in a second direction (typically the MD). The nonwoven has a plurality of bonding points defining a total bonding area along the second direction greater than along the first direction.

In a preferred embodiment, the total bonding area along the second direction is 1.1–5.0 times greater than along the first direction. The nonwoven has unbonded fiber portions and bonded fiber portions, with a bonded portion/unbonded portion ratio greater along the second direction than along the first direction. The first and second directions are mutually transverse, with the first direction preferably being the cross-direction (CD) and the second direction preferably being the machine direction (MD).

Where the bonding points are substantially circular, square or diamond shaped in plan, each of the bonding points are disposed closer to each other in the second direction than in the first direction. The bonding points define gaps of unbonded nonwoven between adjacent bonding points in the first direction of a length 1.1–3.0 times greater than the gaps of unbonded nonwoven between adjacent bonding points in the second direction.

Where the bonding points are substantially oval or rectangular in plan, each of the bonding points is elongated, extends at an angle less than 45 degrees relative to the second direction, and has an extension along the second direction 1.1–10.0 times greater than along the first direction. The bonding points define gaps of unbonded nonwoven between adjacent oval bonding points in the first direction of a length 1.0–3.0 times the length of the gaps of unbonded nonwoven between adjacent bonding points in the second direction.

The nonwoven is defined by substantially randomly oriented fibers, and is preferably a spunbond. The bonding points are produced by using an engraved roll to form bonding points on the nonwoven.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
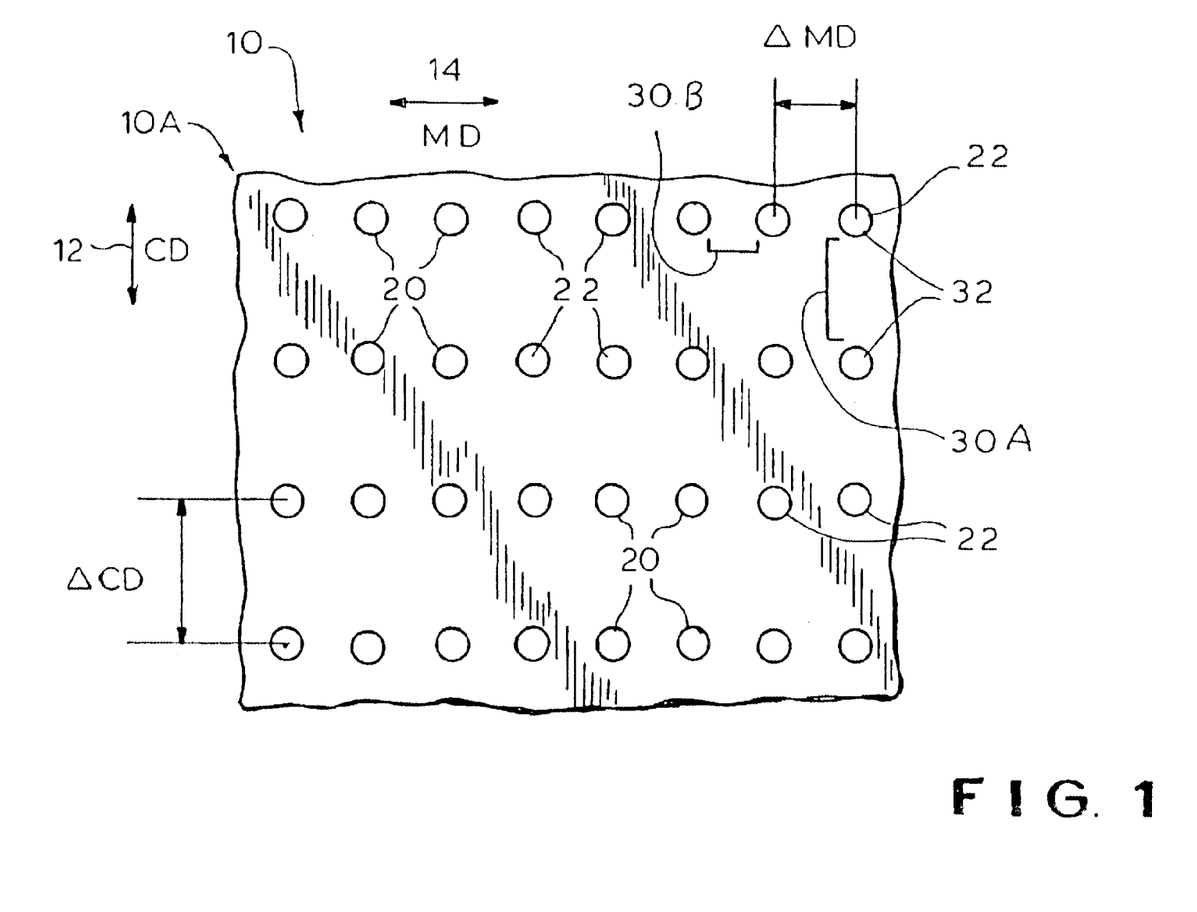
FIG. 1 is a fragmentary schematic top plan view of a nonwoven according to the present invention wherein the bonding points are substantially circular in plan.
Figure 2:
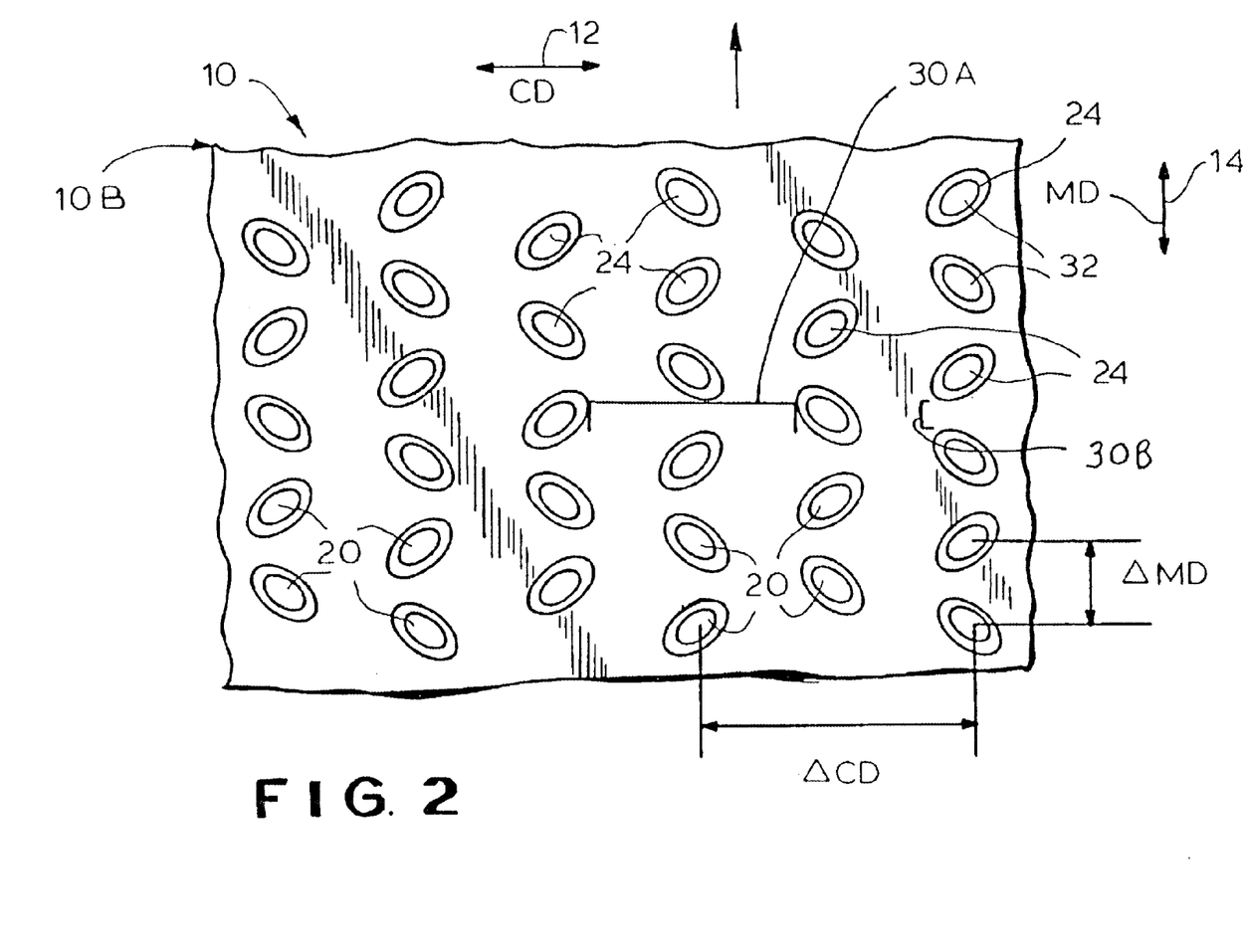
FIG. 2 is a fragmentary schematic top plan view of a nonwoven according to the present invention wherein the bonding points are substantially oval in plan.

Referring now to the drawing, and in particular to FIGS. 1 and 2 thereof, therein illustrated is a nonwoven according to the present invention, generally designated by the reference numeral 10. While the nonwoven 10 is preferably a spunbond fabric, it could be a meltblown fabric, a carded nonwoven fabric or any other type of nonwoven. In any case, the nonwoven 10 is defined by substantially randomly oriented spun fibers.

The nonwoven 10 has a low tensile strength and high percent elongation in a first direction 12 (illustrated by a double-headed arrow as the cross direction or CD) and a high tensile strength and low percent elongation in a second direction 14 (illustrated by a double-headed arrow as the machine direction or MD). The first and second directions are preferably mutually transverse (that is, they extend at right angles to one another), optimally with the first direction 12 being the cross direction (CD) and the second direction 14 being the machine direction (MD). Such a nonwoven is particularly desirable in the diaper-making industry where minimal elongation is required in the MD and yet high elongation is required in the CD. These properties facilitate manufacture of the diaper while providing comfort to the wearer about the waist. As will be appreciated by those skilled in the art, elongation of the nonwoven occurs intermediate the bonding points (and not at the bonding points).

The nonwoven 10 has a plurality of bonding points 20 defining a total bonding area along the MD 14 greater than along the CD 12. More particularly, the total bonding area along the MD 14 is preferably 1.1–5.0 times greater than along the CD 12.

The disposition of the bonding points 20 closer to each other in the MD 14 than in the CD 12 has the effect of increasing the tensile strength and decreasing the percent elongation of the fabric in the MD 14, relative to the tensile and elongation in the CD 12, thus allowing the fabric elongation along the CD 12 to exceed the fabric elongation along the MD 14.

The total bonding ratio may be calculated as follows: (a) Form an imaginary rectangle having a long dimension and a short dimension, the long dimension being aligned with and extending fully across the CD of the fabric. (b) Calculate the total bonding area formed by the bonding points within the rectangle. (This gives the bonding area along the CD.) (c) Re-orient the rectangle by 90 degrees so that the long dimension thereof is now aligned with the MD of the fabric. (d) Calculate the total bonding area formed by the bonding points within the rectangle. (This gives the bonding area along the MD.) These two bonding area measurements may then be used to calculate the ratio of the bonding areas in the CD and MD. Note that the long dimension of the rectangle must exceed the short dimension of the rectangle and is preferably twice the short dimension.

The bonding points 20 are preferably either substantially circular (as illustrated in FIG. 1 by points 22) or substantially oval (as illustrated in FIG. 2 by points 24) in plan, although other shapes may be used.

Referring now to FIG. 1 in particular, in nonwoven 10A the circular bonding points 22 are disposed closer to each other in the MD 14 than in the CD 12. In other words, the center-to-center spacing of the circular bonding points 22 is greater in CD 12 (see ACD) than in the MD 14 (see AMD). The disposition of the bonding points 22 closer to each other in the MD 14 than in the CD 12 has the effect of increasing the tensile strength and decreasing the percentage elongation in the MD 14, relative to the tensile and elongation in the CD 12, thus allowing the elongation of the nonwoven fabric along the CD 12 to exceed the elongation of the nonwoven fabric along the MD 14.

Adjacent circular bonding points 22 define gaps 30A therebetween along the CD 12 having a length 1.1–3.0 times the length of the gaps 30B defined by the adjacent circular bonding points 22 in the MD 14. The magnitude of the gaps increases the elongation properties of the nonwoven 10, thus allowing the elongation along the CD 12 to exceed the elongation along the MD 14.

In a preferred embodiment, the circular bonding points 22 have a diameter of about 0.3–1.0 mm and a center-to-center separation of about 2 times the diameter in the CD and 1.5 times the diameter in the MD.

A particularly simple yet effective distribution of circular bonding points 22 involves the theoretical formation of a uniform pattern (that is, the center-to-center spacing of the circular bonding points 22 being uniform in both the MD and CD), and then removal of alternate lanes of the circular bonding points 22 extending in the MD, thereby to increase the relative center-to-center spacing in the CD, so that the final fabric has a greater percent elongation in the CD than in the MD. The same technique can be used with square or diamond shaped bonding points.

Figure 2A:
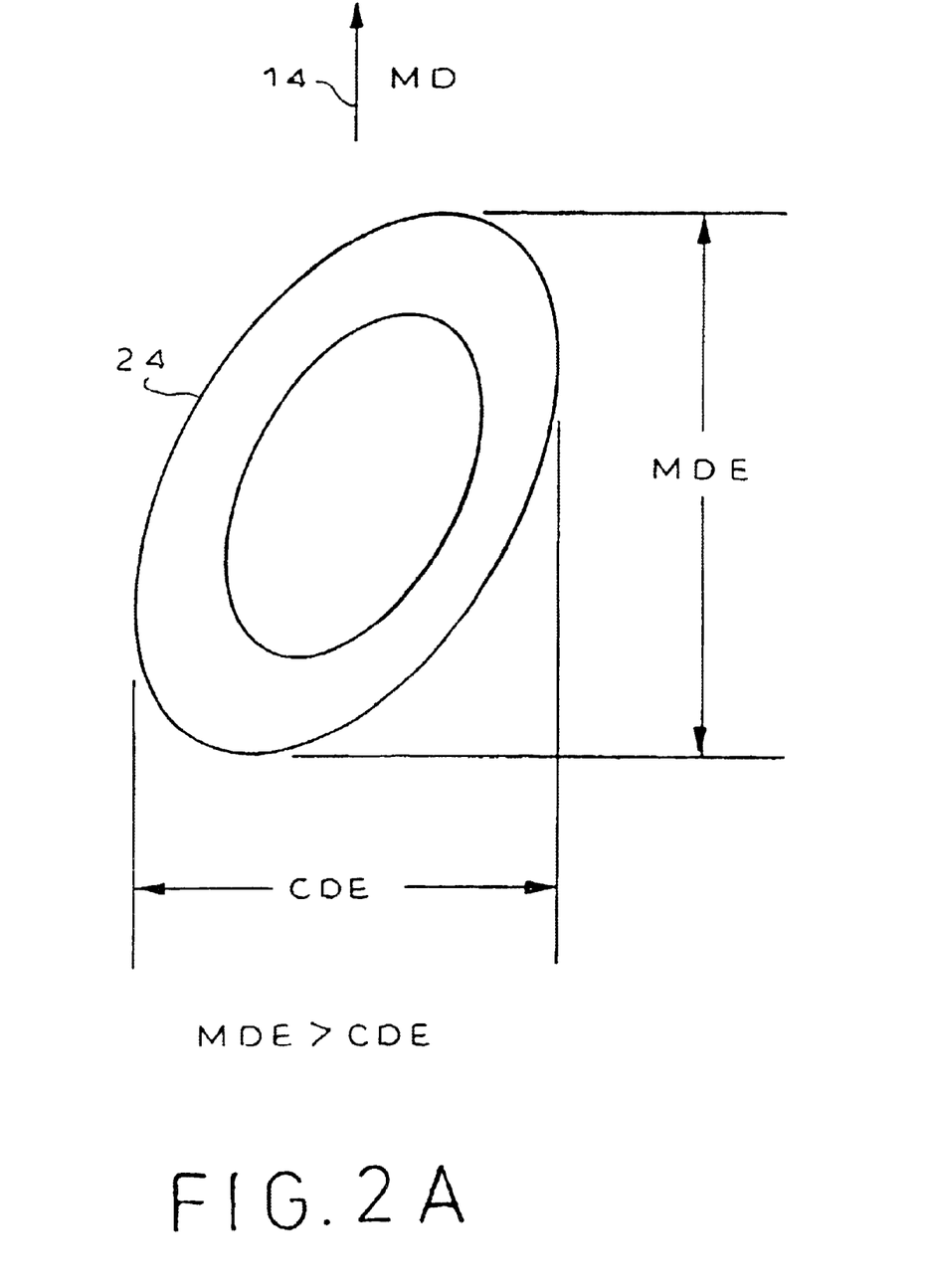
FIG. 2A is a schematic top plan view, to a greatly enlarged scale, of an oval bonding point of FIG. 2.

Referring now to FIGS. 2 and 2A in particular, in nonwoven 10B the oval bonding points 24 have an extension MDE along the MD 14 which is preferably 1.1–10.0 times greater than the extension CDE along the CD 12. Where the extension MDE along the MD 14 exceeds the extension CDE along the CD 12, the resulting fabric has a higher tensile strength and a lower percentage elongation in the MD 14, relative to the tensile and elongation in the CD 12, thus allowing the elongation of the fabric along the CD 12 to exceed the elongation of the fabric along the MD 14. The oval bonding points are elongated and preferably extend at an angle of less than 45 degrees relative to the MD 14. The oval bonding points may be disposed closer to each other in the MD 14 than in the CD 12, thus also allowing the elongation along the CD 12 to exceed the elongation along the MD 14.

The oval bonding point 24 is preferably annular in design, with the central portion defining a plateau, and defines a bonded oval (including the annulus thereof) having a preferred length or major dimension of about 0.0347 in. (0.882 mm) and a preferred width or minor dimension of about 0.02 in. (0.526 mm). The center of an oval bonding point 24 is considered herein to be the intersection of its major and minor axes. The separation between the centers of adjacent oval bonding points 24 in the MD 14 (ΔMD) is preferably about 0.0598 in. (1.521 mm), and the separation between the centers of adjacent oval bonding points 24 in the CD 12 (ΔCD) is preferably about 3.5 mm.

Adjacent oval bonding points 24 define gaps 30A of unbonded nonwoven fabric therebetween along the CD 12 greater in length than the gaps 30B of unbonded nonwoven fabric defined by the adjacent oval bonding points 24 along the MD 14. The magnitude of the gaps of unbonded nonwoven fabric increases the elongation property of nonwoven 10, thus allowing the nonwoven elongation along the CD 12 to exceed the nonwoven elongation along the MD 14. Rectangular shaped bonding points could be used in place of oval shaped points.

Viewing the nonwoven 10 according to the present invention from a different perspective, the nonwoven 10 has unbonded fiber portions 30 characterized by the absence of bonding points 20 and bonded fiber portion 32 characterized by the presence of bonding points 20. The bonded portion 32/unbonded portion 30 ratio (in terms of surface area) is greater along the MD 14 than along the CD 12. The nonwoven of the present invention retains the expected softness, bulkiness, fiber tie down, abrasion resistance, bond strength and overall bonding area as prior art nonwovens.

The bonding points 20 are preferably produced by a thermobonding process using an engraved roll (not shown) to form bonding points 20 on the nonwoven. Spunbond nonwovens typically involve the use of thermofusion, chemical or mechanical bonding techniques to secure the spun fibers together, and the present invention is applicable to all such techniques. For example, in one bonding technique the fabric is passed between a smooth heated roller and an engraved roll which includes the required bonding point shape and/or pattern. In another bonding technique, the fabric is passed between an ultrasonic welding apparatus and the engraved roll. In another method adhesive is used to bind the spun fibers together at the bonding points. Circular or oval bonding points 22 or 24 are preferred to polygonal bonding points. Further, each bonding point could be a collection of smaller bonding points that are grouped together.

Figure 3:
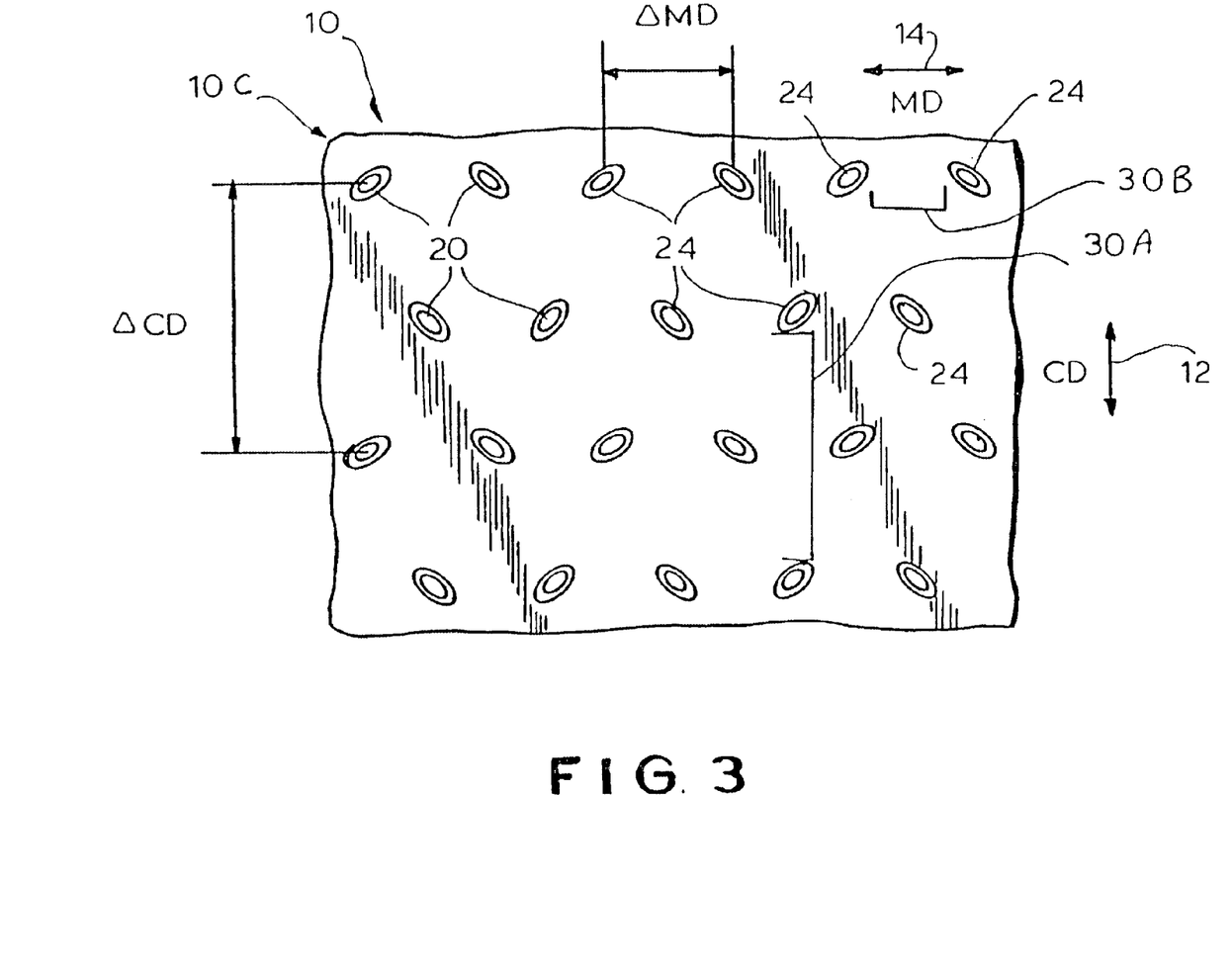
FIG. 3 is fragmentary schematic top plan view of an alternative pattern of bonding points on a nonwoven according to the present invention.

FIG. 3 schematically illustrates alternative nonwoven 10C according to the present invention. Clearly, square or polygonal (rectangular, hexagonal, etc.) bonding points may be used instead of oval or circular ones.

FIG. 3 shows a nonwoven 10C with a pattern using oval bonding points 24, which is a variant of that illustrated in FIG. 2. The oval bonding points 24 define gaps in the nonwoven between adjacent oval bonding points 24 in the CD 12 of a length 1.1–3.0 times the gaps defined between adjacent oval bonding points 24 in the MD 14.

In each of the patterns illustrated herein, the nonwoven has a plurality of bonding points defining a total bonding area along the MD greater than along the CD, so that the nonwoven exhibits low tensile and high elongation in the MD and high tensile and low elongation in the CD.

The nonwovens 10A–10C typically fall into one of two categories of non-symmetrical bonding pattern configurations. FIG. 1A with its circular bonding points 22 falls into the first category wherein the bonding point shapes are uniform in both the MD and CD (for each bonding point), but the pattern of the bonding points is non-uniform (here, because the ΔCD exceeds the ΔMD). Other uniform bonding point shapes include squares or diamonds. On the other hand, FIGS. 2 and 3 with their oval bonding points 24 fall into the second category wherein the bonding point shapes are non-uniform in the MD and CD (because the extension MDE in the MD 14 exceeds the extension CDE in the CD 12), and the pattern of the bonding points may be uniform or not. FIG. 2, with its oval points 24, falls in the second category. In FIGS. 2 and 3 the bonding pattern is non-uniform in the MD and CD which contributes to an increased elongation in the CD. In a uniform bonding pattern, the distance between bonding points in the machine direction (ΔMD) and the distance between bonding points in the cross direction (ΔCD) would be equal.

Utilizing a uniform diamond bonding point shape with a non-uniform bonding point pattern, specifically, a center-to-center separation of bonding points in the CD (ΔCD) that is approximately 3.5 times greater than the center-to-center separation of bonding points in the MD (ΔMD), nonwoven fabrics of various weights (gsm or grams per square meter) were prepared and two inch wide by five inch long samples were tested for both elongation and tensile strength utilizing the EDANA test method ERT 20.2-89. The tests yielded the following results:

| Basis Weight | 10 gsm | 15 gsm | 20 gsm |
| --- | --- | --- | --- |
| MD tensile N | 18.19 | 20.25 | 27.95 |
| MD elongation % | 75.83 | 70.40 | 71.66 |
| CD tensile N | 8.50 | 11.48 | 16.07 |
| CD elongation % | 88.75 | 92.51 | 94.67 |

To enhance longevity of the engraving roll an overlapping pattern in the CD direction is preferred so that the engraving roll is always in contact with the nonwoven being bonded.

As used herein, "elongation" refers to the percentage elongation of a specimen at the breakpoint, and "tensile" refers to the ultimate tensile strength of a specimen at the breakpoint.

As will be appreciated by those skilled in the art, in order to effect changes in both the MD and CD properties, variations in the preliminary compositions, bonding parameters, and thermodynamic parameters (e.g., the drawing, cooling and quenching parameters) may be used. Such parameter changes affect both the MD and CD properties. By way of contrast, only a non-symmetrical bonding pattern minimizes the properties in one direction, while maximizing the properties in the other direction.

While the embodiments described hereinabove utilize bonding points 20 which are circular 22 or oval 24, it will be appreciated that a wide variety of shapes and configurations may be used for the bonding points 20. Indeed, bonding points of different shapes and configurations may be used on a single fabric. Similarly, while a variety of non-symmetrical bonding configurations have been shown in the various embodiments, it will be appreciated that other non-symmetrical configurations may be used instead. The critical limitation is that the shaping and configuration of the bonding points and/or the particular bonding pattern create a fabric which meets the goal of the present invention—namely, a high percent elongation in the first direction (typically the CD) relative to a low percent elongation in the second direction (typically the MD).

The nonwoven fabric of the present invention is preferably formed by the selective bonding of substantially randomly oriented fibers initially providing a uniform fiber density in both the MD and CD so that any distinction between the MD and the CD properties arises out of the selective bonding process of the present invention. However, the selective bonding process of the present invention may also be applied to a nonwoven fabric which does not have a uniform fiber density in both the MD and the CD. See the inventor's copending U.S. patent application Ser. No. 09/373,826, filed Aug. 13, 1999 entitled "Nonwoven Fabric With High CD Elongation And Method Of Making Same"). Where the non-uniform fiber density of the initial nonwoven fabric promotes a greater percent elongation in the CD than the MD, the use of the selective bonding pattern merely enhances the elongation ratio (that is, increases the ratio of elongation in the CD to elongation in the MD). Where the non-uniform density of the initial nonwoven fabric promotes a greater percent elongation in the MD than in the CD, the selective bonding of the present invention must be effective to overcome the initial bias and still cause the fabric to have a greater percent elongation in the CD than in the MD.

A preferred embodiment of the present invention provides a method of making a nonwoven fabric from spun fibers wherein the density of the bonding of the spun fibers in the fabric varies between strips of relatively high bonding density and strips of relatively low bonding density, the strips extending along the length of the fabric in the machine direction in an alternating pattern, with the high density strips separated from each other by low density strips. The alternating high density and low density strips across the cross direction provides the fabric with a higher percent elongation in the cross direction than in the machine direction.

An unexpected attribute of the fabric is an increased bulk density resulting in enhanced softness compared to symmetrically bonded nonwovens. In one example, a symmetrically bonded 15 gsm polypropylene spunbond fabric had one-half the thickness compared to a 15 gsm polypropylene spunbond fabric when bonded with the non-symmetrical pattern described herein.

The materials of the present invention find utility in a wide variety of industrial applications. For example, the materials are useful as filters for air filtration, car filters, liquid filters and filter bags. The materials are also useful in industrial protective clothing such as clean room apparel, commodity consumer clothing, dust protection and chemical protection. The materials are further useful as industrial wipes such as clean room wipes, oil absorption wipes, lens cleaning wipes, and surface protection for low friction and/or non-scratch surfaces. Other industrial applications for the materials include house wrapping, packaging, furniture and bedding, car covers, insulation, battery separators, shoe components and the like.

Further, the materials of the present invention find utility in a wide variety of hygiene applications. For example, the materials are useful as topsheets, backsheets or outer covers, leg cuffs, waistbands, stretch tabs, elastic or extendable side panels, and acquisition or distribution layers.

Finally, the materials of the present invention also find utility in a wide variety of medical applications. For example, the materials are useful as surgical drapes, surgical gowns, cut-in-place gowns, shoe covers, bouffant caps and sterilization wrapping.

The specification of particular applications hereinabove is to be taken as exemplary only, and not as limiting. Uses other than the aforenoted industrial, hygiene and medical applications follow naturally from the physical and chemical properties of the materials of the present invention.

The asymmetric bonding pattern materials of the present invention find particular utility in hygienic applications, especially as topsheets, backsheets or outer covers, stretch tabs, elastic or extendable side panels and acquisition or distribution layers.

To summarize, the present invention provides a nonwoven having a non-symmetrical bonding pattern and, in particular, a low tensile and high elongation in the first direction (typically the CD) and high tensile and low elongation in the second direction (typically the MD). The nonwoven is suitable for use in the diaper-making industry, and is simple and economic to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A method of making a nonwoven fabric having high elongation in a first direction and low elongation relative thereto in a second direction normal to the first direction, comprising the steps of:
   (A) providing a nonwoven defined by substantially randomly oriented, substantially continuous fibers of polypropylene; and
   (B) applying to the nonwoven a regular pattern of bonding points, the bonding points defining a total bonding area along the second direction greater than along the first direction, the bonding points forming a uniform pattern of bond density in the first direction different from the uniform pattern of bond density in the second direction, each bonding point being formed from a collection of smaller bonding points that are grouped together.

2. The method of claim 1 wherein the total bonding area along the second direction is 1.1–5.0 times greater than along the first direction.

3. The method of claim 1 wherein the nonwoven has a low tensile strength relative thereto in the first direction and a high tensile strength in the second direction.

4. The method of claim 1 wherein the bonding points are substantially oval in plan.

5. The method of claim 4 wherein each of the oval bonding points has an extension along the second direction 1.1–10.0 times greater than along the first direction.

6. The method of claim 4 wherein the oval bonding points are elongated and extend at an angle less than 45° relative to the second direction.

7. The method of claim 4 wherein the oval bonding points define gaps therebetween of unbonded nonwoven in the first direction of a length 1.1–3.0 times the length of the gaps therebetween of unbonded nonwoven defined by the oval bonding points in the second direction.

8. The method of claim 1 wherein the bonding points are circular in plan and disposed closer to each other in the second direction than in the first direction.

9. The method of claim 8 wherein the circular bonding points define gaps therebetween of unbonded nonwoven in the first direction of a length 1.1–3.0 times the gaps therebetween of unbonded nonwoven defined by the circular bonding points in the second direction.

10. The method of claim 1 wherein the first direction is the cross-direction (CD) and the second direction is the machine direction (MD).

11. The method of claim 1 wherein the nonwoven is selected from the group consisting of a spunbond fabric and a meltblown fabric.

12. The method of claim 1 wherein the bonding points are produced by a process selected from the group consisting of a thermobonding process using an engraved roll to form bonding points on the nonwoven, an ultrasonic process using an engraved roll to form bonding points on the nonwoven, and a chemical adhesive process using a screen roll to form bonding points on the nonwoven.

13. The method of claim 1 wherein said bonding points define gaps therebetween of unbonded nonwoven in the first direction of a length greater than the length of the gaps therebetween of unbonded nonwoven defined by the bonding points in the second direction.

14. The method of claim 1 wherein said bonding points have a center-to-center separation greater in the first direction than in the second direction.

15. The method of claim 1 wherein the bonding points have a common orientation and common dimensions.

16. A method of making a nonwoven fabric having low tensile strength and high percent elongation in a first direction and high tensile strength and low percent elongation relative thereto in a second direction normal to the first direction, comprising the steps of:

(A) providing a nonwoven defined by substantially randomly oriented, substantially continuous fibers of polypropylene; and (B) applying to the nonwoven a regular pattern of bonding points, the bonding points defining a total bonding area along the second direction greater than along the first direction, the bonding points forming a uniform pattern of bond density in the first direction different from the uniform pattern of bond density in the second direction, the total bonding area along the second direction being 1.1–5.0 times greater than along the first direction, thereby causing the nonwoven to have unbonded fiber portions and bonded fiber portions, with a bonded portion/unbonded portion ratio greater along the second direction than along the first direction, each bonding point being formed from a collection of smaller bonding points that are grouped together.

17. The method of claim 16 wherein each of the bonding points is substantially oval in plan, has an extension along the second direction 1.1–10.0 times greater than along the first direction, and is elongated and extends at an angle less than 45 degrees relative to the second direction, the oval bonding points defining gaps therebetween of unbonded nonwoven in the first direction of a length 1.0–3.0 times the gaps therebetween of unbonded nonwoven defined by the bonding points in the second direction.

18. The method of claim 16 wherein each of the bonding points is circular in plan and disposed closer to each other in the second direction than in the first direction, the circular bonding points defining gaps of unbonded nonwoven in the first direction of a length 1.1–3.0 times the gaps of unbonded nonwoven defined by the circular bonding points in the second direction.

19. The method of claim 16 wherein the first and second directions are mutually transverse, and the nonwoven is a spunbond defined by substantially randomly oriented fibers, with the bonding points being produced by a thermobonding process using an engraving roll to form bonding points on the nonwoven.

20. The method of claim 16 wherein the bonding points have a common orientation and common dimensions.

21. A method of making a nonwoven fabric having low tensile strength and high elongation in a first direction and high tensile strength and low elongation relative thereto in a second direction normal to the first direction, comprising the steps of:

(A) providing a nonwoven defined by substantially randomly oriented, substantially continuous fibers of polypropylene; and (B) applying to the nonwoven a regular pattern of bonding points, the bonding points defining a total bonding area along the second direction greater than along the first direction, the bonding points forming a uniform pattern of bond density in the first direction different from the uniform pattern of bond density in the second direction, the bonding points defining gaps therebetween of unbonded nonwoven in the first direction of a length greater than the length of the gaps therebetween of unbonded nonwoven defined by the bonding points in the second direction, each bonding point being formed from a collection of smaller bonding points that are grouped together.

22. The method of claim 21 wherein the bonding points have a common orientation and common dimensions.

23. A method of making a nonwoven fabric having high elongation in a first direction and low elongation relative thereto in a second direction normal to the first direction, comprising the steps of:

(A) providing a nonwoven defined by substantially randomly oriented, substantially continuous fibers of polypropylene; and (B) applying to the nonwoven a regular pattern of bonding points, the bonding points having a center-to-center separation greater in the first direction than in the second direction, the bonding points forming a uniform pattern of bond density in the first direction different from the uniform pattern of bond density in the second direction, each bonding point being formed from a collection of smaller bonding points that are grouped together.

24. The method of claim 23 wherein the bonding points have a shape in plan selected from the group consisting of circular, square, oval and diamond.

25. The method of claim 23 wherein the bonding points have a common orientation and common dimensions.

26. A method of making a nonwoven fabric having low tensile strength and high elongation in the CD and high tensile strength and low elongation relative thereto in the MD, comprising the steps of:

(A) providing a nonwoven defined by substantially randomly oriented, substantially continuous fibers of polypropylene; and (B) applying to the nonwoven a regular pattern of bonding points, the bonding points being non-symmetrical in plan, the bonding points forming a uniform pattern of bond density in the CD different from the uniform pattern of bond density in the MD, each bonding point having an extension in the CD less than the extension in the MD, each bonding point being formed from a collection of smaller bonding points that are grouped together.

27. The method of claim 26 wherein the bonding points have a center-to-center separation greater in the CD than in the MD.

28. The method of claim 26 wherein the bonding points have a common orientation and common dimensions.

* * * * *